2,787,562

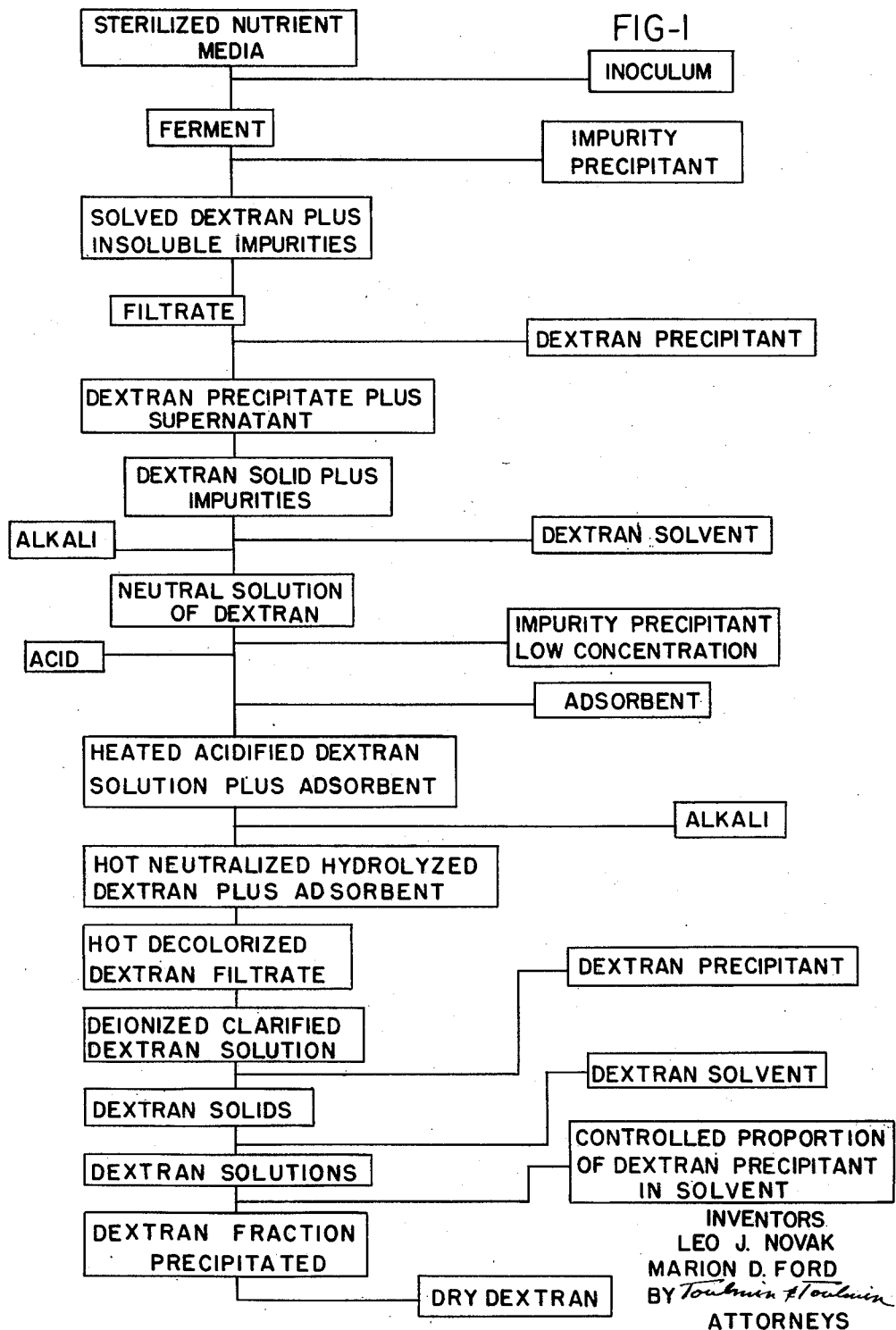

ACID HYDROLYSIS OF DEXTRAN IN PRESENCE OF ACTIVATED CHARCOAL

Marion D. Ford and Leo J. Novak, Dayton, Ohio, assignors to The Commonwealth Engineering Company of Ohio, Dayton, Ohio, a corporation of Ohio Application December 12, 1951, Serial No. 261,172

1 Claim. (Cl. 127—36)

This invention relates to an improved process for the preparation of hydrolyzed dextran, and more particularly to an improved process for the decolorization of dextran.

This application is related to copending applications of Stoycos and Novak, Serial No. 240,579, filed August 6, 1951 now abandoned; Stoycos, Serial No. 240,580, filed August 6, 1951, Patent Number 2,687,368; and Novak, Serial No. 240,581, filed August 6, 1951, now abandoned.

Gum dextran is a high molecular weight material produced by the action of micro-organisms such as *Leuconostoc mesenteroides* or *Leuconostoc dextranicum* on a nutrient media containing a sucrose bearing material such as refined sugar, raw sugar, molasses, and so forth. The bacterial action produces what may be termed a raw dextran, the time for the production requiring approximately 16 to 40 hours under temperature conditions of about 23 to 27° C. and during the course of the reaction the fermenting solution becomes highly viscous. This viscous aqueous solution contains as well as the dextran, impurities such as levans, proteins, fructose and matter which tends to color the resultant dextran slightly.

In one process of dextran production the aqueous solution is treated with a small amount of an alcohol to render the impurities insoluble and after a series of filtration steps an excess of alcohol or other precipitating agent is added to secure the high molecular weight dextran as a precipitate. This precipitated material has a utility for many purposes and if hydrolyzed to lower molecular weights in the range of 30,000 to 200,000 may be employed as a substitute for blood plasma, a very useful function stemming from the physicochemical properties of the dextran. For this latter purpose it is essential that the product be of high quality, and it may be said that in general prior art products have been deficient to some degree as to purity, turbidity in solution, excessive molecular weight range, all of which factors contribute to unpredictable properties of the product. The hydrolysis process itself however leads to the development of discoloration, which discoloring matter must be removed from the product.

One difficulty of the prior art processes is that a very large number of steps are required for the production of a pure dextran of proper molecular weight range. Thus after the raw dextran has been attained in the ferment, precipitation and filtration steps are required for the separation of impurities; hydrolysis of the water soluble dextran is then necessitated in order to reduce the molecular weight range of the product of the ferment, which range may vary from a few thousand to several million; thereafter decolorization, deionization and clarification steps are required prior to or after fractionation, which latter step separates the low and high molecular weight dextran from the material of desired range of molecular weight. It is clear therefore that a reduction in the number of the presently numerous required process steps together with the attainment of a clear purified dextran is much to be desired.

It has now been discovered that if decolorization of the dextran is accomplished in the acid hydrolysis solution during hydrolyzed dextran production, that not only is the decolorization effective but that the adsorbent medium utilized in the decolorization also has a tendency to selectively remove the low molecular weight dextran from the solution, thus facilitating the ultimate fractionations and rendering the lines of demarcation between dextran fractions considerably sharper.

It is therefore an object of this invention to provide a process for the production of pure hydrolyzed dextran having a reduced number of process steps.

It is a principal object of this invention to provide a process for the production of hydrolyzed dextran in which decolorization of the dextran takes place simultaneously with the hydrolyzing step.

It is a further object of this invention to provide a process for the production of hydrolyzed dextran which facilitates dextran fractionation into specified molecular weight ranges.

These and other allied objectives are attained by contacting a dextran solution during the steps of hydrolyzing the dextran with an adsorbent material which acts to remove from the solution not only the impurities which would tend to color the ultimate products but which tends also to remove from the product to a greater degree low molecular weight fractions of the dextran, which fractions normally are separable from the product only by carefully controlled and repeated solvent fractionations.

Preferably the adsorbent material is introduced to the dextran solution, which is to undergo hydrolysis, at the start of the hydrolysis step. Under this condition the reactions occurring during hydrolysis which normally give rise to difficultly removable discoloration are considered to be inhibited. For example, in the presence of acid, dextran impurities such as levan decomposition products may react with protein impurities, particularly those containing tryptophane, to form dark colored substances (humins); if the adsorbent material is present during the hydrolysis the dark colored materials will be adsorbed to some degree as they form, thus preventing association of the molecules of the material into larger molecules which would not be readily subject to such adsorption.

Preferably also the adsorbent material is retained in contact with the solution until neutralization thereof after the completion of hydrolysis. This procedure is particularly important in circumstances where very high acid concentrations are utilized in the hydrolysis step since impurities not readily adsorbed at high acid concentrations will be garnered by the adsorbent material as neutralization proceeds.

However, while contact of the adsorbent with the solution during the complete hydrolysis and neutralization steps is recommended the same is not necessary and the adsorbent may be added to the hydrolytic solution at any time prior to neutralization. Thus where the nature of the fermented products, and the quality of the impurity separation steps preceding hydrolysis minimize the tendency of high molecular weight discoloration products to form during hydrolysis, addition of the adsorbent immediately prior to neutralization is effective to remove the discoloring materials.

It has been found that the adsorbent materials which are practicularly effective in the process of invention include carbon adsorbents, particularly activated charcoal, the clays, and diatomaceous earth silicates. In the selection of the adsorbent it is essential that the material be one which does not impart soluble matter to the acid solution. Thus where activated charcoal is utilized the same must be free of inorganic components, such as iron, the sulphides, etc., which at high acid concentrations of the hydrolysis would dissolve therein. Such impurities may be removed by treating the adsorbent, for example charcoal, with 0.1 N hydrochloric acid, and then washing the charcoal to neutrality.

These adsorbent materials when introduced into the solution during hydrolysis remain in the solid state under the conditions of the hydrolytic action and throughout the neutralization step, while the dextran itself is soluble and accordingly the adsorbent materials are readily removed after the completion of hydrolysis and neutralization by filtration means.

The insoluble adsorbent will remove from the solution low molecular weight dextran fractions as well as the decolorizing impurities. Such low molecular weight fractions, particularly those below 10,000, are normally difficult to remove from the end product by fractionation methods; thus when the higher molecular weight fractions are precipitated out of a dextran solution some small amount of low molecular weight material will come down therewith and repeated solvation and precipitation is necessitated to effect the separation of the low molecular weight substance from the desired product. By selectively adsorbing a large portion of the low molecular weight product in the hydrolysis step the number of fractionation steps may be materially reduced.

The invention will be more fully understood by reference to the following detailed examples and accompanying flow sheet wherein:

The figure indicates a complete method of production of a dry hydrolyzed dextran by the process of invention.

Example I

In the practice of the invention, as may be noted from Figure 1, a sterilized nutrient media containing in parts by weight:

0.5% casein hydrolysate, enzymatic
0.5% $K_2HPO_4$
0.2% NaCl
0.1% bacto-yeast extract
20% sucrose (white granulated sugar) .0022% $MnSO_4$ The balance being water is inoculated with an inoculum containing the same components which are present in the nutrient media and including also a strain of *Leuconostoc mesenteroides*.

The percentage of inoculum may be 5–10% by weight of that of the nutrient media and the combined solutions are maintained at a temperature of approximately 23–27° C. for a period of about 24 to 48 hours, during which time fermentation of the nutrient media takes place, giving rise to the production of raw dextran.

To the finished ferment there is added approximately 15% by weight of isopropyl alcohol, the effect of which is to inhibit further growth and to decrease the viscosity of the ferment. The alcohol in this concentration also renders more insoluble any impurities which are present in the solution, but in the noted concentration the dextran remains soluble. This solution of dextran is normally on the highly acid side and may be acidified as necessary with hydrochloric acid to a pH between 2 and 4 and then basket centrifuged or filtered to remove the insoluble impurities. The effect of removing the impurities at this point is to materially lower the nitrogen content and remove inorganic elements of the solution and assist clarification thereof.

The translucent filtrate obtained by the above separation process may then be treated with about 50% by weight of a solution of isopropyl alcohol, thus precipitating crude dextran. The crude dextran precipitate may be washed with isopropyl alcohol to assist in removing all impurities possible at this stage, and then the partially purified dextran precipitate is dissolved in water and the solution neutralized by the addition of sodium hydroxide to bring the pH in the range of 6.8–7.

To this neutralized solution there is then added isopropyl alcohol to the extent of about 20% by volume of the water present and sufficient hydrochloric acid is introduced to bring the pH of the solution in the range of about 1.04.

These latter steps have the effect of reducing the viscosity of the solution without precipitating the dextran, the dextran itself in water solution being normally highly viscous at normal concentrations.

The solution is now ready for the effecting of hydrolysis and accordingly, as may be noted from Figure 1, decolorizing adsorbents in accordance with the process of invention are added. Thus charcoal to the extent of 5% by weight of the total solution may be introduced at this point. The solution containing the activated charcoal is then heated to about 85° C. and hydrochloric acid is added as required to maintain the pH at about 1.04; the solution maintained at this temperature and pH for about 40 to 50 minutes. During this heating period hydrolysis of the dextran takes place and decolorizing matter formed in the hydrolytic process and introduced into the process with the reagents is quite completely taken up by the charcoal. Also low molecular weight dextran generated by the hydrolysis or present from the fermented product is to a large extent taken up by the charcoal.

At the end of the hydrolytic action the solution containing the charcoal is first neutralized to a pH of about 6.8–7 by the addition of 40% sodium hydroxide while the solution is still hot. During this neutralization the action of the adsorbent continues at an accelerated rate. The neutralized solution while still hot, that is approximately 85° C., is then filtered to remove therefrom the charcoal and the adsorbed materials, and the decolorized dextran filtrate may then be deionized and clarified as set forth in co-pending application, Serial No. 240,581, filed August 6, 1951, now abandoned. Thereafter the hydrolyzed dextran may be precipitated from the neutral solution by the addition thereto of isopropyl alcohol.

This hydrolyzed product will contain a wide range of molecular weights; however, the range will have been compressed over that of the raw dextran not only by the hydrolytic action, which reduced the higher molecular weight portions, but also by the adsorption of the very low molecular weights of the charcoal. Accordingly separation of the material into particular molecular weight ranges is greatly facilitated. Thus by solving the hydrolyzed product in, for example, water and then treating with a small quantity of a precipitant, for example, isopropyl alcohol to the extent of 30% by weight of the solution, the higher molecular weight material may be precipitated. This first fraction due to the lowered concentration of very low molecular weight materials will be substantially free thereof; the water solution may then again be treated with a somewhat higher concentration of precipitant in order to selectively settle out the next molecular weight range and so on until the desired range is attained. Each precipitated portion may of course be re-dissolved and itself fractionated. The lower end product of a higher fraction may be added to an upper product of a lower fraction to attain desired end results. The necessity for repeated fractionations to remove very low molecular weight materials is however substantially eliminated due to the action of the charcoal in the hydrolysis step.

Example II

The same procedure is employed as in Example I except that the activated charcoal is utilized to the extent of 10% by weight of the hydrolysis solution. The weight increase of the activated charcoal is substantially the same in both instances indicating that 5–10% by weight of charcoal is satisfactory.

Example III

The same procedure may be employed as in Example I except that ethyl alcohol is employed as the precipitating agent rather than isopropyl alcohol, and the temperature of hydrolysis which is controlled by the alcohol is 78° C. Also the adsorbent utilized may be a diatomaceous earth silicate consisting essentially of $SiO_2$ present to the extent of 5-10% by weight of the hydrolyzing solution. The time of hydrolysis is not affected by the slightly lower temperature and the resultant product is substantially equivalent to that of Example I.

Example IV

The same procedure may be employed as in Example I except that methyl alcohol is substituted for the isopropyl alcohol, and the temperature of hydrolysis is about 65° C., and the time is increased to about 55-60 minutes.

While the activity of the adsorbent used is generally lower at lower temperatures the longer time assists in completing the adsorption process. The adsorbent in this case may be a finely divided clay present to the extent of 5-10% by weight of the hydrolysis solution and which is free of all inorganic impurities soluble at low pH. The result attained is similar to that set forth in Example I.

Example V

The procedure may be the same as in Example I except that the activated charcoal is introduced upon completion of the hydrolysis and before neutralization. Under this condition a contact time of about 10 minutes of the charcoal with the solution at 85° C. is permitted. The result is about the same as set forth in Example I.

It will be understood that the specific acids and pH values set forth hereinbefore may be varied for particular time conditions of hydrolysis and that the invention is not to be considered limited to the particular values of the examples which are given by way of illustration only.

It will be understood that while there have been given herein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claim.

We claim:

A process for producing an aqueous solution of hydrolyzed dextran substantially free of discoloring matter and dextran fractions of molecular weight below 10,000, and suitable for clinical use, from native dextran of high molecular weight as produced by fermentation from sucrose, which comprises dissolving the native dextran in water, adding about 20% by volume of isopropyl alcohol to the solution, acidifying the solution to pH about 1.04, adding about 5% to 10% by weight of finely divided activated charcoal free of inorganic components to the solution, heating the solution to about 85° C., maintaining the solution at atmospheric pressure, the temperature of about 85° C. and the pH of about 1.04 for about 40 to 50 minutes, neutralizing the solution at the temperature of about 85° C., and filtering the solution at said temperature to remove the charcoal having coloring impurities and dextran fractions of molecular weight below 10,000 adsorbed thereto.

References Cited in the file of this patent

UNITED STATES PATENTS

| | | |
|---|---|---|
| 58,824 | Hirsh | Oct. 16, 1866 |
| 1,447,461 | Brewster | May 6, 1923 |
| 2,261,919 | Pittman | Nov. 4, 1941 |
| 2,383,914 | Monte | Aug. 28, 1945 |
| 2,389,119 | Cantor | Nov. 20, 1945 |
| 2,437,518 | Gronwall et al. | Mar. 9, 1948 |
| 2,490,716 | Smith | Dec. 6, 1949 |
| 2,565,507 | Lockwood et al. | Aug. 28, 1951 |
| 2,610,132 | Newkirk | Sept. 9, 1952 |